(12) United States Patent
Coco

(10) Patent No.: US 10,376,101 B2
(45) Date of Patent: *Aug. 13, 2019

(54) COOKING OIL STORAGE AND FILTRATION SYSTEM

(71) Applicant: Sal Coco, Corona, CA (US)

(72) Inventor: Sal Coco, Corona, CA (US)

(*) Notice: Subject to any disclaimer, the term of this patent is extended or adjusted under 35 U.S.C. 154(b) by 732 days.

This patent is subject to a terminal disclaimer.

(21) Appl. No.: 13/745,420

(22) Filed: Jan. 18, 2013

(65) Prior Publication Data

US 2013/0193044 A1     Aug. 1, 2013

Related U.S. Application Data

(60) Provisional application No. 61/588,144, filed on Jan. 18, 2012.

(51) Int. Cl.
A47J 37/12     (2006.01)

(52) U.S. Cl.
CPC ................... *A47J 37/1223* (2013.01)

(58) Field of Classification Search
None
See application file for complete search history.

(56) References Cited

U.S. PATENT DOCUMENTS

| | | | | |
|---|---|---|---|---|
| 2,247,040 A | * | 6/1941 | Whitsett | A47J 37/1223 210/238 |
| 2,425,848 A | * | 8/1947 | Vawter | B01D 25/00 210/167.31 |
| 2,902,161 A | | 9/1959 | Humbert, Jr. | |
| 3,206,077 A | | 9/1965 | Fetterman | |
| 3,263,818 A | * | 8/1966 | Gedrich | A47J 37/1223 210/167.28 |
| 3,279,605 A | * | 10/1966 | Shepherd | B01D 35/0273 210/110 |
| 3,355,026 A | * | 11/1967 | Schut | B01D 29/23 210/416.5 |
| 3,368,682 A | * | 2/1968 | Boots | A47J 37/1223 210/121 |
| 3,400,824 A | * | 9/1968 | Weimer | A47J 37/1223 210/238 |
| 3,616,907 A | * | 11/1971 | Van Vleet | A47J 37/1223 210/167.28 |
| 3,630,361 A | * | 12/1971 | Keating | A47J 37/1223 210/134 |
| 3,701,313 A | * | 10/1972 | Boggs | A47J 37/1233 210/167.28 |
| 3,707,907 A | * | 1/1973 | Wilson | A47J 37/1223 210/DIG. 8 |
| 3,735,693 A | | 5/1973 | Pelster | |
| 3,900,580 A | | 8/1975 | Boggs | |
| 4,084,492 A | * | 4/1978 | Sullivan | A47J 27/18 137/393 |

(Continued)

*Primary Examiner* — Robert J Popovics
(74) *Attorney, Agent, or Firm* — Knobbe, Martens, Olson & Bear, LLP

(57) ABSTRACT

A system for pumping cooking oil from a filtration device or cooking oil reservoir to a storage tank or back into the cooking oil reservoir. The system can also be used to pump oil from the storage tank to a disposal location. The system can include a pump used to pump oil from one location to another. The system can include a housing for containing the pump and/or the storage tank. The system can include a fresh oil storage tank.

2 Claims, 8 Drawing Sheets

(56) References Cited

U.S. PATENT DOCUMENTS

| | | | | |
|---|---|---|---|---|
| 4,095,673 A * | 6/1978 | Takeuchi | ............... | B67D 7/845 184/1.5 |
| 4,113,623 A * | 9/1978 | Koether | ............... | A47J 37/1223 210/167.28 |
| 4,195,667 A | 4/1980 | Moore | | |
| 4,210,123 A | 7/1980 | Moore | | |
| 4,210,177 A | 7/1980 | Moore | | |
| 4,230,574 A | 10/1980 | Whaley | | |
| 4,259,567 A | 3/1981 | Moore | | |
| 4,282,094 A * | 8/1981 | Mitchell | ............... | B01D 37/02 210/167.28 |
| 4,324,173 A | 4/1982 | Moore | | |
| 4,360,046 A * | 11/1982 | Streit | ............... | C11B 13/00 141/231 |
| 4,485,831 A * | 12/1984 | Ungerleider | ............... | A47J 37/1271 137/1 |
| 4,502,373 A * | 3/1985 | Keating | ............... | A47J 37/1223 210/167.28 |
| 4,513,614 A * | 4/1985 | Adcock | ............... | B01D 29/114 73/169 |
| 4,517,082 A * | 5/1985 | Prudhomme | ............... | A47J 37/1223 210/117 |
| 4,583,170 A | 4/1986 | Carlin | | |
| 4,591,434 A * | 5/1986 | Prudhomme | ............... | A47J 37/1223 210/117 |
| 4,622,135 A * | 11/1986 | Williams | ............... | A47J 37/1223 137/335 |
| 4,623,455 A * | 11/1986 | Adcock | ............... | B01D 29/114 210/167.04 |
| 4,646,793 A * | 3/1987 | Sherratt | ............... | A47J 37/1271 137/358 |
| 4,688,475 A | 8/1987 | Witt | | |
| 4,702,827 A * | 10/1987 | Wenzel | ............... | A47J 37/1223 210/117 |
| 4,768,426 A * | 9/1988 | Nett | ............... | A47J 27/0817 210/167.28 |
| 4,826,590 A * | 5/1989 | Turman | ............... | A47J 37/1223 210/98 |
| 4,913,922 A | 4/1990 | Hawkes | | |
| 4,945,893 A | 8/1990 | Manchester | | |
| 4,959,144 A * | 9/1990 | Bernard | ............... | A47J 37/1223 210/232 |
| 4,974,501 A | 12/1990 | Grob | | |
| 4,991,608 A * | 2/1991 | Schweiger | ............... | F28G 9/00 134/102.2 |
| 5,049,264 A * | 9/1991 | Rosnack | ............... | A23D 9/06 210/117 |
| 5,112,479 A * | 5/1992 | Srimongkolkul | ............... | B01D 29/05 210/149 |
| 5,139,678 A * | 8/1992 | Frederick, Jr. | ............... | B01D 36/02 210/195.2 |
| 5,160,444 A | 11/1992 | McFarland | | |
| 5,172,328 A | 12/1992 | Cahlander | | |
| 5,179,891 A * | 1/1993 | Chiu | ............... | A47J 27/0817 210/167.28 |
| 5,186,097 A | 2/1993 | Vaseloff | | |
| 5,209,218 A | 5/1993 | Daneshvar | | |
| 5,228,985 A * | 7/1993 | Wells | ............... | A47J 37/1223 210/167.28 |
| 5,243,898 A * | 9/1993 | Sakuma | ............... | A23L 5/11 426/438 |
| 5,247,876 A * | 9/1993 | Wilson | ............... | A47J 37/1223 99/408 |
| 5,249,511 A * | 10/1993 | Shumate | ............... | A47J 37/1223 99/408 |
| 5,340,471 A * | 8/1994 | Wilson | ............... | A47J 37/1223 210/167.28 |
| 5,417,851 A * | 5/1995 | Yee | ............... | B01D 29/96 210/167.01 |
| 5,423,979 A * | 6/1995 | Allen | ............... | B01D 19/0005 159/47.1 |
| 5,458,772 A | 10/1995 | Eskes | | |
| 5,487,907 A | 1/1996 | Drown | | |
| 5,510,023 A * | 4/1996 | Taylor | ............... | B01D 29/018 210/167.02 |
| 5,597,601 A * | 1/1997 | Griffin | ............... | A47J 37/1223 210/167.28 |
| 5,609,193 A * | 3/1997 | Steckler | ............... | A47J 37/1271 137/341 |
| 5,617,777 A * | 4/1997 | Davis | ............... | A47J 37/1223 210/167.28 |
| 5,629,039 A | 5/1997 | Brintle | | |
| 5,731,024 A | 3/1998 | Bivens | | |
| 5,776,530 A | 7/1998 | Davis | | |
| 5,782,164 A | 7/1998 | Brintle | | |
| 5,812,060 A * | 9/1998 | DeSpain | ............... | A47J 37/1266 340/618 |
| 5,839,360 A * | 11/1998 | Williams | ............... | A47J 37/1223 99/408 |
| 5,847,365 A | 12/1998 | Harter | | |
| 5,861,093 A | 1/1999 | Bennett | | |
| 5,870,945 A * | 2/1999 | Bivens | ............... | A47J 37/1223 99/408 |
| 5,961,612 A | 10/1999 | Satoh | | |
| 5,964,258 A * | 10/1999 | Schoenbauer | ............... | A47J 37/1223 141/231 |
| 6,009,794 A * | 1/2000 | Casey | ............... | A47J 37/1266 219/492 |
| 6,022,473 A * | 2/2000 | Mickelson | ............... | B67D 7/845 141/98 |
| 6,041,802 A * | 3/2000 | Nelson | ............... | A47J 37/1271 137/14 |
| 6,168,723 B1 | 1/2001 | Moody | | |
| 6,202,543 B1 * | 3/2001 | Moya | ............... | A47J 37/1223 210/167.28 |
| 6,207,051 B1 * | 3/2001 | Anderson | ............... | B01D 46/2411 210/237 |
| 6,234,063 B1 | 5/2001 | Evers | | |
| 6,235,210 B1 * | 5/2001 | Saksena | ............... | A47J 37/1223 210/167.28 |
| 6,254,790 B1 * | 7/2001 | King | ............... | A47J 37/1223 210/767 |
| 6,306,294 B1 * | 10/2001 | Blair | ............... | A47J 37/1271 210/167.28 |
| 6,330,852 B1 * | 12/2001 | Williams | ............... | A47J 37/1223 210/167.28 |
| 6,372,129 B1 * | 4/2002 | Moody | ............... | B01D 17/005 210/181 |
| 6,557,570 B1 * | 5/2003 | Gierbolini | ............... | B08B 9/0325 134/111 |
| 6,715,514 B2 | 4/2004 | Parker, III | | |
| 6,783,685 B2 * | 8/2004 | Hwang | ............... | A47J 37/1223 210/690 |
| 6,792,983 B2 * | 9/2004 | Allora | ............... | A47J 37/1223 141/18 |
| 6,981,531 B1 * | 1/2006 | Palazzo | ............... | B08B 9/08 141/198 |
| 7,354,511 B2 * | 4/2008 | Becker | ............... | B01D 35/0276 137/544 |
| 7,377,210 B1 * | 5/2008 | Franco | ............... | A47J 37/1271 141/340 |
| 7,566,468 B1 | 7/2009 | Oberlin | | |
| 7,735,526 B2 | 6/2010 | Palazzo | | |
| 7,938,959 B1 * | 5/2011 | Inman | ............... | A47J 37/1233 137/206 |
| 7,993,530 B2 * | 8/2011 | Horne | ............... | B01D 35/26 210/167.02 |
| 8,111,979 B2 * | 2/2012 | Feinberg | ............... | A47J 37/1223 392/463 |
| 8,153,001 B2 * | 4/2012 | Peters | ............... | B01D 29/27 210/232 |
| 8,246,824 B2 | 8/2012 | Larin | | |
| 8,474,662 B2 * | 7/2013 | Palazzo | ............... | A47J 37/0871 211/59.2 |
| 8,497,691 B2 | 7/2013 | Behle | | |
| 8,627,762 B2 | 1/2014 | Gvili | | |
| 8,831,413 B2 * | 9/2014 | Arnold | ............... | G01F 23/0053 392/441 |

(56) References Cited

U.S. PATENT DOCUMENTS

| | | | |
|---|---|---|---|
| D721,533 S | 1/2015 | Coco | |
| 8,926,837 B1* | 1/2015 | Shumate | A47J 37/1276 210/167.28 |
| 8,992,773 B2* | 3/2015 | Marheine | B01D 29/56 210/167.28 |
| 9,156,390 B2 | 10/2015 | Allora | |
| 9,392,907 B2 | 7/2016 | Allora | |
| 9,481,562 B2 | 11/2016 | Vandersteen | |
| 9,512,383 B2 | 12/2016 | Palazzo | |
| 9,528,510 B2 | 12/2016 | Tiszai | |
| 2002/0035931 A1* | 3/2002 | Tschopp | A47J 37/1223 99/408 |
| 2003/0192621 A1 | 10/2003 | Allora | |
| 2004/0020555 A1 | 2/2004 | Sus | |
| 2004/0058043 A1* | 3/2004 | More | A47J 37/1223 426/438 |
| 2004/0159243 A1* | 8/2004 | Theodos | A47J 37/1285 99/330 |
| 2006/0065582 A1* | 3/2006 | Bell | A47J 37/1223 210/167.28 |
| 2007/0227597 A1 | 10/2007 | Palazzo | |
| 2007/0266679 A1* | 11/2007 | Horne | B01D 35/26 55/356 |
| 2008/0196596 A1 | 8/2008 | Forrest | |
| 2008/0213445 A1 | 9/2008 | Feinberg | |
| 2008/0213446 A1 | 9/2008 | Feinberg | |
| 2008/0277412 A1 | 11/2008 | Palazzo | |
| 2009/0039004 A1 | 2/2009 | Andersen | |
| 2009/0078659 A1* | 3/2009 | Whitlock | A47J 37/1223 210/773 |
| 2010/0116345 A1* | 5/2010 | Florkey | A47J 37/1223 137/1 |
| 2010/0201528 A1 | 8/2010 | Bruinsma | |
| 2010/0326288 A1 | 12/2010 | Tiszai | |
| 2011/0186592 A1 | 8/2011 | Palazzo | |
| 2011/0238310 A1 | 9/2011 | Estrellado | |
| 2011/0276164 A1 | 11/2011 | Bourg, Jr. | |
| 2011/0276169 A1 | 11/2011 | Bourg, Jr. | |
| 2012/0030993 A1 | 2/2012 | Crosier | |
| 2013/0087508 A1 | 4/2013 | Haddock | |
| 2013/0183421 A1 | 7/2013 | Evraets | |
| 2013/0193044 A1* | 8/2013 | Coco | A47J 37/1223 210/167.28 |
| 2013/0193084 A1* | 8/2013 | Vogt | A47J 37/1223 210/774 |
| 2013/0278276 A1 | 10/2013 | Behle | |
| 2014/0004234 A1 | 1/2014 | Mosteller | |
| 2014/0356499 A1 | 12/2014 | Palazzo | |
| 2015/0101966 A1* | 4/2015 | Coco | A47J 37/1223 210/86 |
| 2015/0101972 A1* | 4/2015 | Coco | A47J 37/1223 210/167.28 |
| 2015/0374173 A1 | 12/2015 | McGhee | |
| 2016/0033463 A1 | 2/2016 | Robertson | |
| 2017/0030880 A1 | 2/2017 | Behle | |

\* cited by examiner

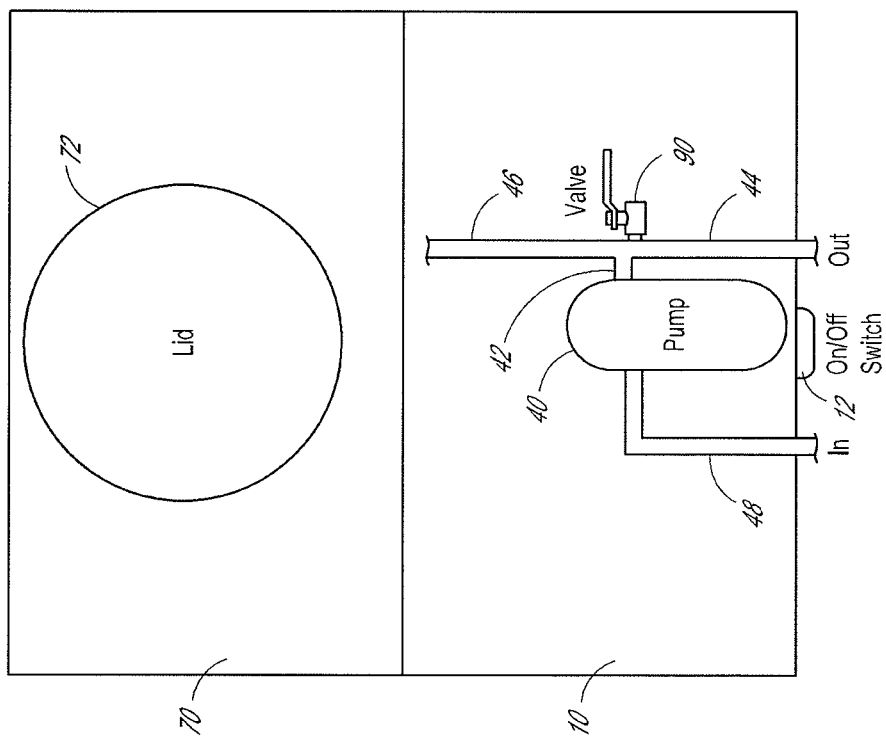

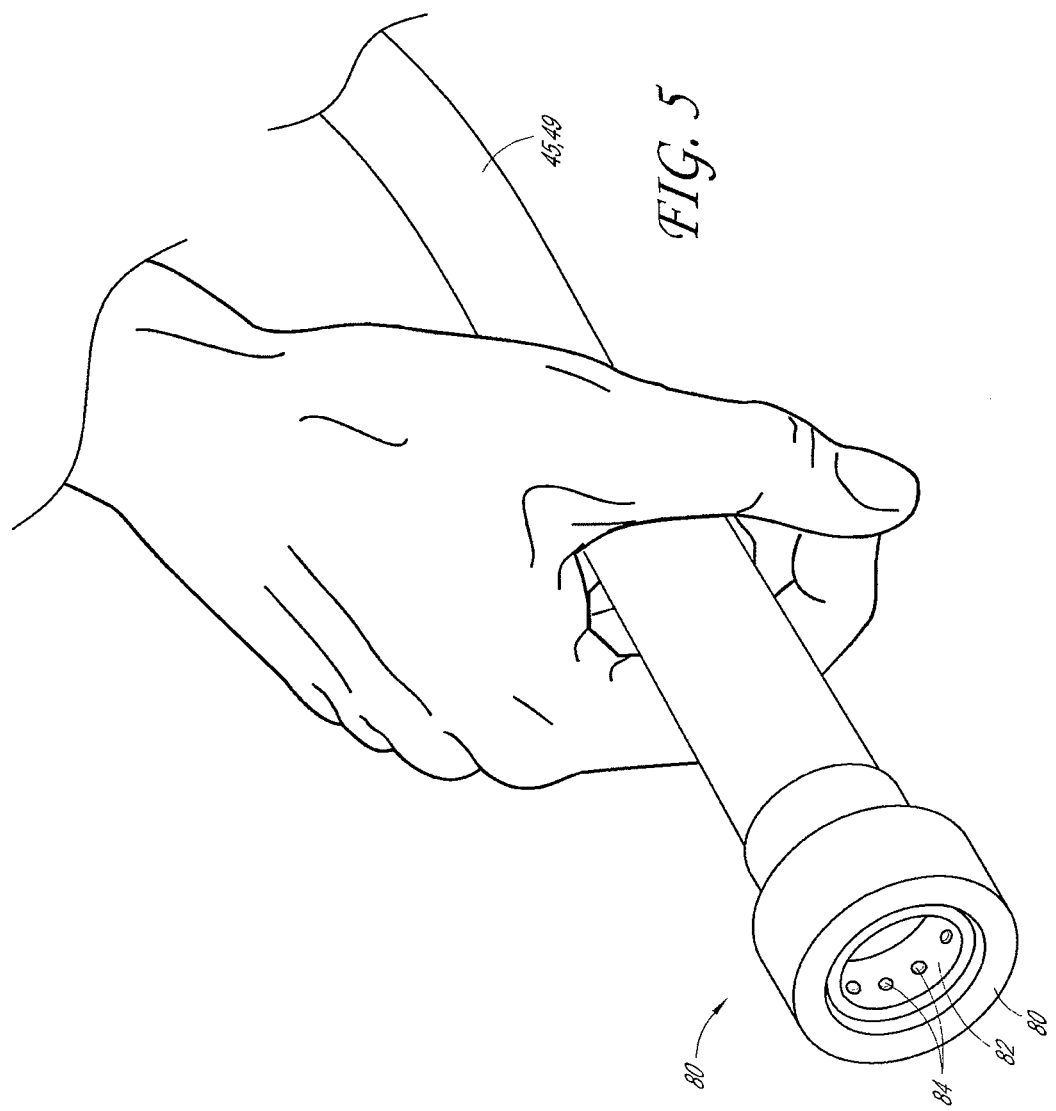

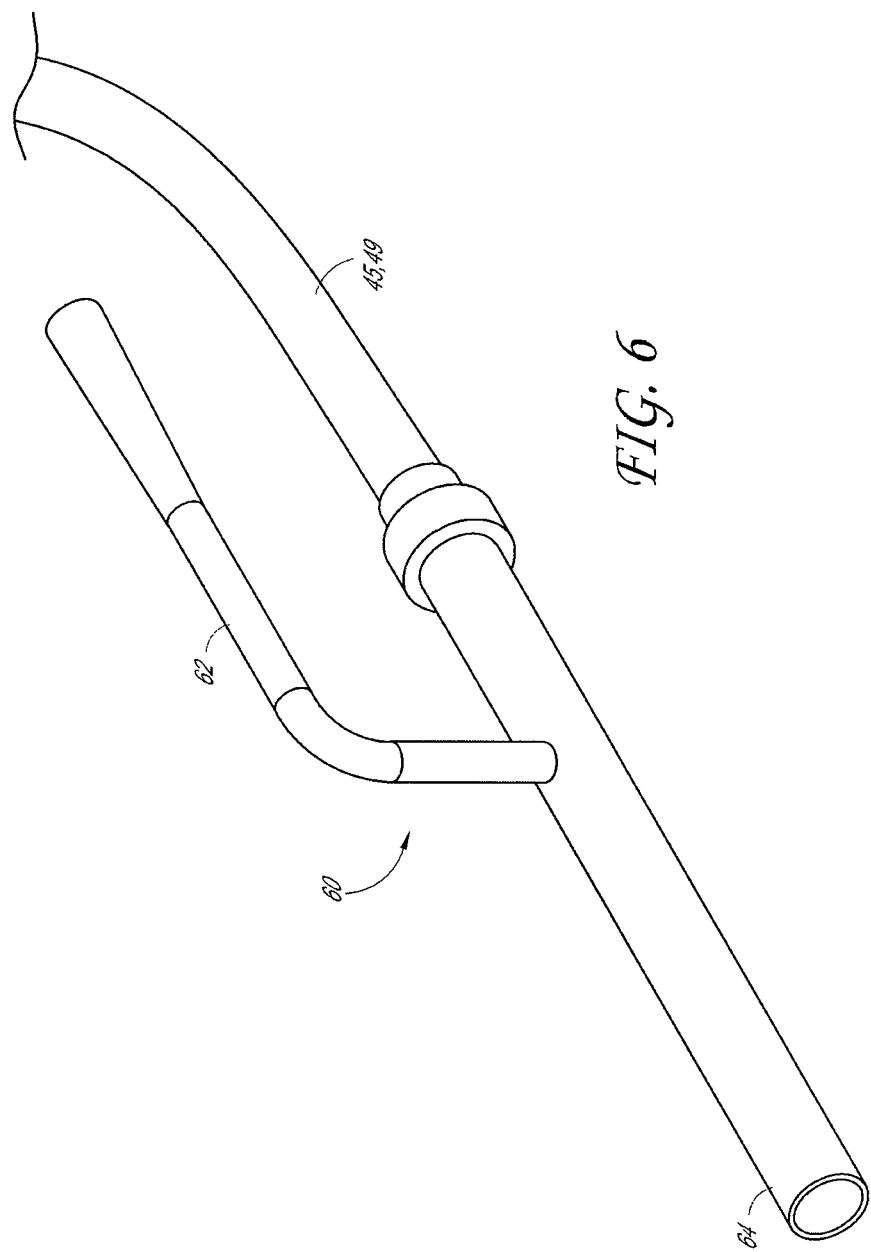

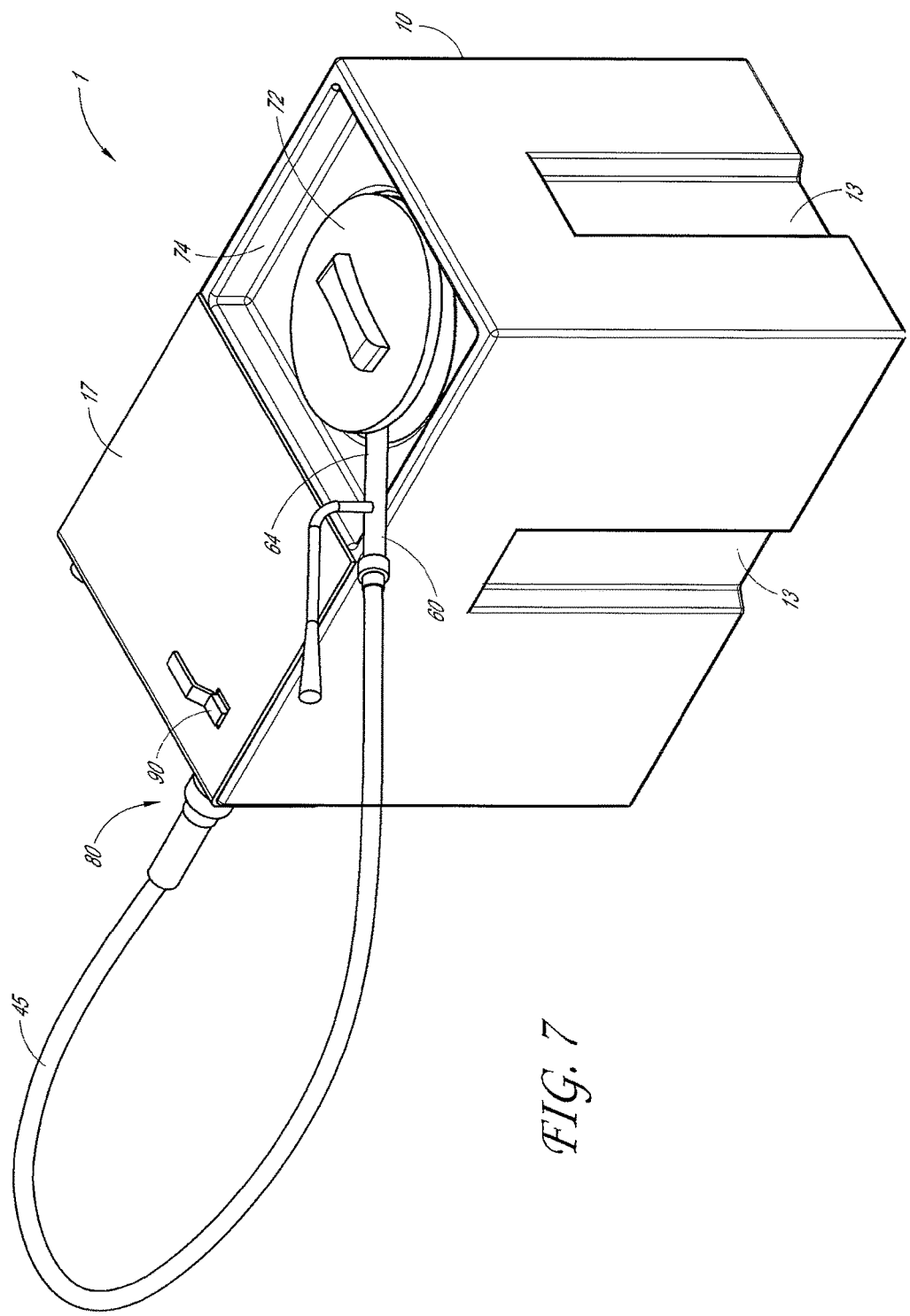

COOKING OIL STORAGE AND FILTRATION SYSTEM

CROSS-REFERENCE TO RELATED APPLICATIONS

The present application claims priority under 35 U.S.C. § 119(e) to U.S. Provisional Application No. 61/588,144 filed on Jan. 18, 2012, the disclosure of which is incorporated by reference herein in its entirety.

BACKGROUND OF THE INVENTION

Field of the Invention

The present disclosure relates to a system for storing and containing cooking oils and greases and, in particular, concerns a system that allows for filtration and storage of used cooking grease and oil in a single container.

Description of the Related Art

Cooking in oil is a very common form of cooking in the restaurant trade. All fried food, including French fries and other staples of diners and fast food restaurants, are typically cooked in a fryer which contains heated cooking oil. As the oil is used, food particles often become entrained in the oil. These particles can spoil the oil which can make the used oil unsanitary and can make later-cooked items taste bad. Consequently, cooking oil must periodically be cleaned (e.g., filtered) or replaced to avoid spoiling the oil and adversely affecting the taste of food cooked in the oil.

Generally, in larger restaurants, used oil is contained in a large, movable container. Used cooking oil unfit for reuse in the fryers often must be transported off of the site of the restaurant. Used cooking oil can be a valuable component suitable for recycling or reuse into other applications (e.g., for use in biodiesel engines). Further, cooking oil typically cannot be disposed of in the sewer system. Not only can the oil be harmful to the environment, it can also clog the sewer system.

However, one difficulty that restaurants experience is that there is a limited amount of space available for both filtration systems and storage containers for used and new cooking oil. Restaurant kitchens are often crowded spaces that require work surfaces and storage surfaces for use in the preparation and storage of the food being served in the restaurant. As such, many restaurants do not have sufficient space to efficiently handle filtration systems and storage systems in addition to deep fryers. Storing filtration systems and storage systems outside of the kitchen can lead to sanitation issues when those systems are transported into the kitchen.

Additionally, the filtration and storage of used cooking oil can be a messy and difficult process to complete within the confines of a restaurant kitchen. In many cases, filtering and disposing of or reusing the oil involves moving and/or lifting containers of oil. Moving and lifting of the containers can lead to spills of the oil. Oil spills in the kitchen can be both messy and dangerous, as there is a risk that restaurant employees and others could slip and fall. Additionally, moving and lifting the containers of oil can lead to injury due to the sheer weight of the oil.

Hence, there is a need for a cooking oil filtration and storage system that more efficiently uses the space available in a restaurant kitchen. To this end, there is a need for a system that can extract oil from the deep fryer for both storage and filtration purposes while fitting within the confines of a restaurant kitchen.

SUMMARY OF THE INVENTION

Disclosed are various embodiments of systems for storing and containing cooking oils and greases, specifically those systems which include a pump and holding tank contained within the same container. The system can further include a filtration device for filtering used oil and/or grease. The system can be used to remove oil from a first container (e.g., a fryer in a commercial kitchen), filter the oil, and deposit the oil either back in the first container or into a second container.

According to at least one embodiment, the system for pumping and storing cooking oils from one or both of a cooking oil reservoir and a filtration device can include a housing defining an internal storage volume, a storage tank mounted within the housing, and a pump mounted on a surface of the housing. The system can further include a pump interface mounted on a top surface of the housing and a side surface of the housing, the pump interface having a top portion and a side portion. In some embodiments, the system includes a first control valve located on one of the top portion of the pump interface, the side portion of the pump interface, and an outer surface of the housing, the first control valve adapted to transition between a first orientation and a second orientation.

The system can further include at least one intake hose opening connected to the pump and located on one of the top portion of the pump interface, the side portion of the pump interface, and an outer surface of the housing, the at least one intake hose opening adapted to intake oil from one of the cooking oil reservoir and the filtration device. At least one outlet hose can be connected to the pump and located on one of the top portion of the pump interface, the side portion of the pump interface, and an outer surface of the housing, the at least one outlet hose adapted to output oil away from the pump. Furthermore, a pump actuator can be located on one of the top portion of the pump interface, the side portion of the pump interface, and an outer surface of the housing and can be transferable from a first configuration to a second configuration, wherein the pump is powered on when the pump actuator is in the first configuration and the pump is powered off when the pump actuator is in the second configuration. The pump can pump cooking from of the cooking oil reservoir and the filtration device back to the cooking oil reservoir when the first control valve is in the first orientation and the pump actuator is in the first configuration. In some embodiments, the pump can pump cooking oil from one of the cooking oil reservoir and the filtration device to the storage tank when the first control valve is in the second orientation and the pump actuator is in the first configuration.

In some embodiments, the system includes a cooking oil compartment mounted on the outside of or on the inside of the housing. The system can include a second control valve mounted on one of the top portion of the pump interface, the side portion of the pump interface, and an outer surface of the housing, the second control valve adapted to transition from a first setting to a second setting. The pump can pump oil from the cooking oil compartment to one of the storage tank and the cooking oil reservoir when the second control valve is set to the first setting and the pump actuator is in the first configuration. The pump can pump cooking oil from one of the cooking oil reservoir and the filtration device to one of the storage tank and the cooking oil reservoir when the second control valve is set to the second setting and the pump actuator is in the first configuration.

According to some embodiments, a cooking oil storage and filtration system for use in a kitchen with a cooking oil reservoir and a filtering pan can include a housing that defines an interior storage volume, a storage tank and a first control valve. The system can further include a pump having an inlet and an outlet, wherein the pump pumps cooking oil into the inlet from one or both of the cooking oil reservoir and the filtration pan, and wherein the pump pumps cooking oil out from the outlet of the pump. The first control valve can transition between a first configuration and a second configuration and can provide fluid communication between the outlet of the pump and the cooking oil reservoir when the first control valve is in the first configuration. Furthermore, the first control valve can provide fluid communication between the outlet of the pump and the storage tank when the first control valve is in the second configuration. In some embodiments, the storage tank and the pump are mounted within the interior storage volume of the housing. The system can further include a filtration pan mounted within the interior storage volume of the housing. The housing can be dimensioned to fit underneath a standard kitchen counter in a restaurant. In some embodiments, the first control valve is a three way ball valve.

In some embodiments, the system can further include a cooking oil compartment and a second control valve, wherein the second control valve transitions between a first orientation and a second orientation. The second control valve can provide fluid communication between the cooking oil compartment and the inlet of the pump when in the first orientation. In some embodiments, the second control valve provides fluid communication between the inlet of the pump and one of the filtration pan and the cooking oil reservoir when the second control valve is in the second orientation.

According to some embodiments, a system for pumping and storing cooking oil from an oil reservoir in a kitchen in combination with a filtration device includes a housing that defines an interior storage volume and a pump system having a user actuated control. The pump system can pump oil out of the oil reservoir in the kitchen and, when the user actuated control is in a first orientation, the pump system can pump the oil through the filtration device and back into the oil reservoir in the kitchen. In some embodiments, when the user actuated control is in a second orientation, the pump can pump the oil into the interior storage volume to remove the oil from the oil reservoir in the kitchen.

The pump system can include a pump and at least one outlet port that is attached to the pump that permits oil from the oil reservoir to be pumped out of the oil reservoir. In some embodiments, the pump system includes an intake hose opening and an outlet hose opening, wherein the intake hose opening is connected to the pump so as to intake oil from the oil reservoir and the outlet hose opening pumps oil away from the pump. The pump system can further include an intake hose connected to the intake oil opening and an outlet hose connected to the outlet opening. In some embodiments, one or more of the intake hose and the outlet hose comprises a quick connect feature, the quick connect feature adapted to releasably connect with one or more of the intake opening and the outlet opening. The quick connect feature can include one or more engagement features adapted to releasably engage with one or more connecting features on the intake opening and/or on the outlet opening.

In some embodiments, the system further includes a pump interface mounted on the top of the housing and a side of the housing, the pump interface comprising a top portion and a side portion, wherein the user actuated control is located on the top portion and the intake hose opening and outlet hose opening are located on the side portion. In some configurations, the filtration device is mounted within the housing. The housing can be dimensioned to fit underneath a standard kitchen counter in a restaurant. In some embodiments, the housing has external dimensions of 32" tall by 18" wide by 28" deep. The pump system can include a pump that is positioned within the interior storage volume of the container and wherein the pump is at least a 5 horsepower pump. In some embodiments, the system further comprises a pump actuator that transitions between an activation position and a deactivation position, the pump actuator causing the pump to power on when in the activation position and causing the pump to power off when in the deactivation position. The system can further include an electrical connection, the electrical connection comprising a female plug adapted to receive a male electrical plug.

BRIEF DESCRIPTION OF THE DRAWINGS

Various embodiments are depicted in the accompanying drawings for illustrative purposes, and should in no way be interpreted as limiting the scope of the disclosure, in which like reference characters denote corresponding features consistently throughout similar embodiments.

FIG. 1B is a top schematic view of the system of FIG. 1A.

FIG. 5 is a close up perspective of a hose connector.

FIG. 6 is a close up perspective view of a spout of a hose.

FIG. 7 is a rear perspective view of the system of FIG. 1A including a hose and spout.

DETAILED DESCRIPTION OF THE PREFERRED EMBODIMENT

Figure 1A:
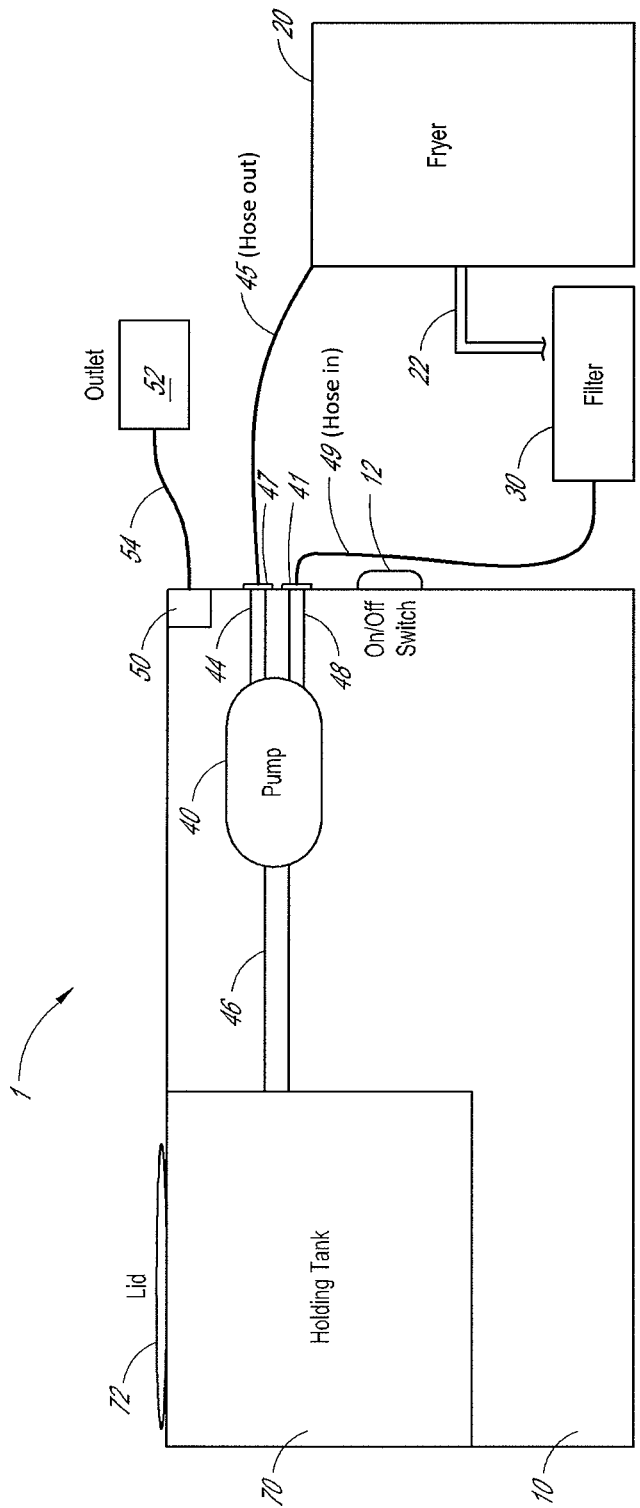
FIG. 1A is a side schematic view of a system for pumping and storing cooking oils.

Reference will now be made to the drawings wherein like number refer to like parts throughout. FIGS. 1A and 1B illustrate an embodiment of a cooking oil storage and filtration system 1. The system 1 is adapted to be used in conjunction with a cooking oil reservoir 20 (e.g., a deep fryer) that has a holding tank containing used cooking oil. The size or number of the cooking oil reservoirs 20 and the consequent size and capability of the system 1 will vary depending upon the implementation without departing from either the scope or the teachings of the present disclosure.

As illustrated, the system 1 can include a housing 10 defining an internal volume. The housing 10 can be sized and dimensioned to fit underneath a counter in a commercial kitchen. For example, the housing can measure 32" tall by 18" wide by 28" deep. In some embodiments, the housing 10 is sized and dimensioned to fit in another part of the kitchen (e.g., in a storage closet). The housing 10 can include one or more power inputs 50 such as, for example, an electrical connection 50. The electrical connection 50 can be a male or female plug adapted to receive a female or male electrical plug. In some embodiments, an electrical extension cord 54 can be used connect the electrical connection 50 to an electrical outlet 52 or other source of electricity.

The system can include a filtering pan 30 of a type known in the industry. The filtering pan 30 can be mounted onto or into the housing 10 or can be separate from the housing 10. In some embodiments, the filtering pan 30 is installed within the housing 10. In some embodiments, the filtering pan 30 is adapted to be used separate from the housing 10. In some such embodiments, the filtering pan 30 can be dimensioned to be stored within the housing 10 when the system 1 is not in use.

The system 1 can include a pump 40. The pump 40 can be used to extract oil from the cooking oil reservoir 20 and/or from the filtering pan 30. In embodiments, the pump 40 can be a 5 horsepower pump or other appropriate pump 40 known in the art. The pump 40 can be adapted to extract oil from the cooking oil reservoir 20 into filtering pan 30. In some configurations, the pump 40 is adapted to extract oil from the cooking oil reservoir 20 and/or the filtering pan 30 into the pump 40.

The system 1 can include a pump inlet 48 connected to the pump 40. The pump inlet 48 can be adapted to facilitate fluid communication with the interior of the pump 40. The pump inlet 48 can, in some configurations, be accessed via an intake port 41 from outside of the housing 10. In some embodiments, the intake port 41 is connected to an intake hose 49 or other fluid conduit. The intake hose 49 can be removably connected to the filtering pan 30. In some embodiments, the intake hose 49 provides fluid communication between the pump inlet 48 and the filtering pan 30. In some embodiments, the intake hose 49 can be used to create fluid communication between the pump inlet 48 and the cooking oil reservoir 20. The cooking oil reservoir 20 can include a drain 22. The drain 22 can be used to transfer oil or other fluids from the cooking oil reservoir 20 into the filtering pan 30. In some embodiments, the intake hose 49 is adapted to mate with the drain 22 and provide fluid communication between the cooking oil reservoir 20 and the pump inlet 48.

In some embodiments, the system 1 includes an pump outlet 42 connected to the pump 40. The pump outlet 42 can be adapted to facilitate fluid communication with the interior of the pump 40. In some embodiments, a valve 90 is connected to the pump outlet 42. The valve 90 can be adapted to facilitate selective communication between the pump outlet 42 and one or more outlet channels. In some embodiments, the valve 90 is a three-way valve (e.g., a three-way ball valve). The outlet channels of the system 1 can include a storing channel 46 and/or a reuse channel 44.

The valve 90 can be adapted to transition between a reuse orientation and a storing orientation. When in the reuse orientation, the valve 90 can provide fluid communication between the pump outlet 42 and the reuse channel 44. In some embodiments, the system 1 includes an outlet port 47 that can be accessed from outside of the housing 10. The system 1 can include an outlet hose 45 adapted to connect to the outlet port 47. In some embodiments, the outlet hose 45 can facilitate fluid communication between the outlet port 47 and the cooking oil reservoir 20. In some such embodiments, cooking oil or other fluids can be pumped from the cooking oil reservoir 20 or from the filter 30, into the pump 40 and back into the cooking oil reservoir 20.

When in the storing orientation, the valve 90 can provide fluid communication between the pump outlet 42 and a storage tank 70. The storage tank 70 can be a sub-compartment within the housing 10. In some embodiments, the storage tank 70 is a separate volume adapted to mount into the housing 10. The storage tank 70 can have a lid 72 configured to allow access to the interior of the storage tank 70 from outside the storage tank 70 and/or the housing 10.

The housing 10 can include a pump actuator 12. The pump actuator 12 can be adapted to transition between an activation position and a deactivation position. When in the activation position, the pump actuator 12 can cause the pump to power on. When in the deactivation position, the pump actuator 12 can prevent the pump from running. In some embodiments, the pump actuator 12 is a button that can be depressed to transition the pump actuator 12 to the activation position. In some such configurations, the pump actuator 12 is biased such that it will return to a non-depressed position and deactivate the pump 40 when the depressing force (e.g., a finger of the user of the system 1) is removed from the button. In some embodiments, the actuator 12 can be a rotatable knob that is biased to the deactivation position.

Figure 3:
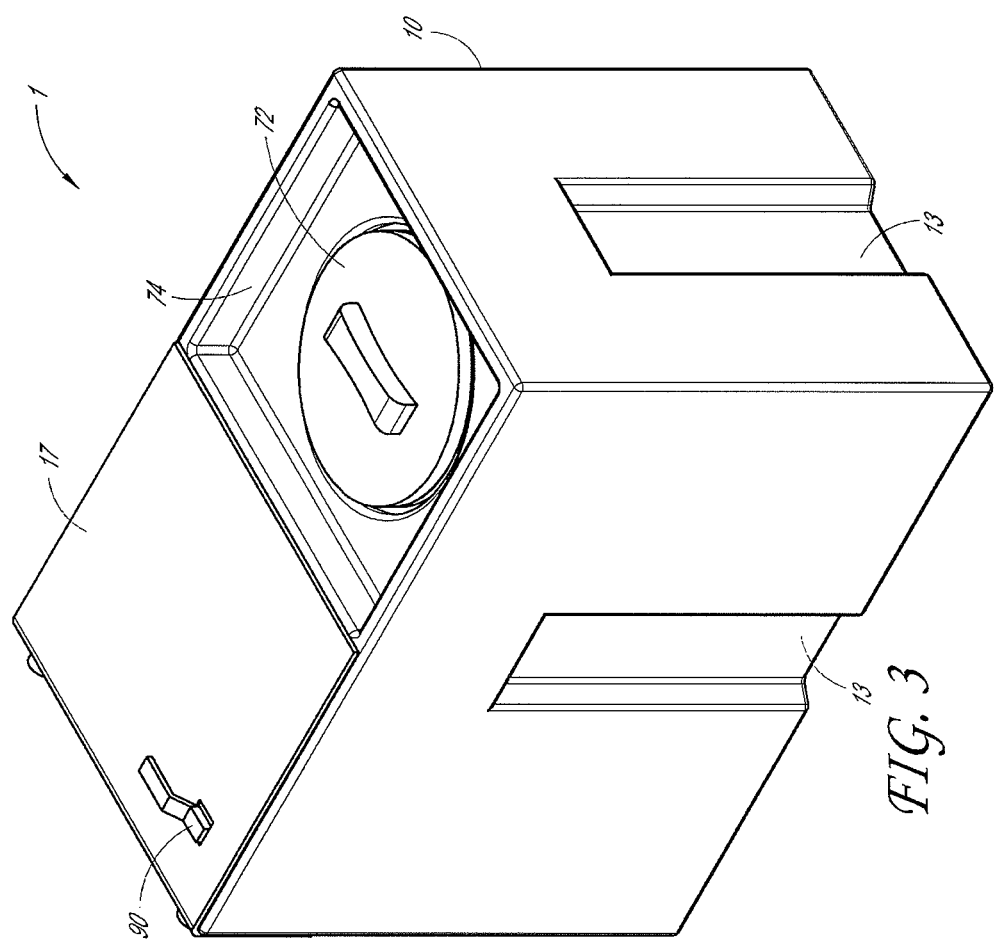
FIG. 3 is a rear perspective view of the system of FIG. 1A.
Figure 4:
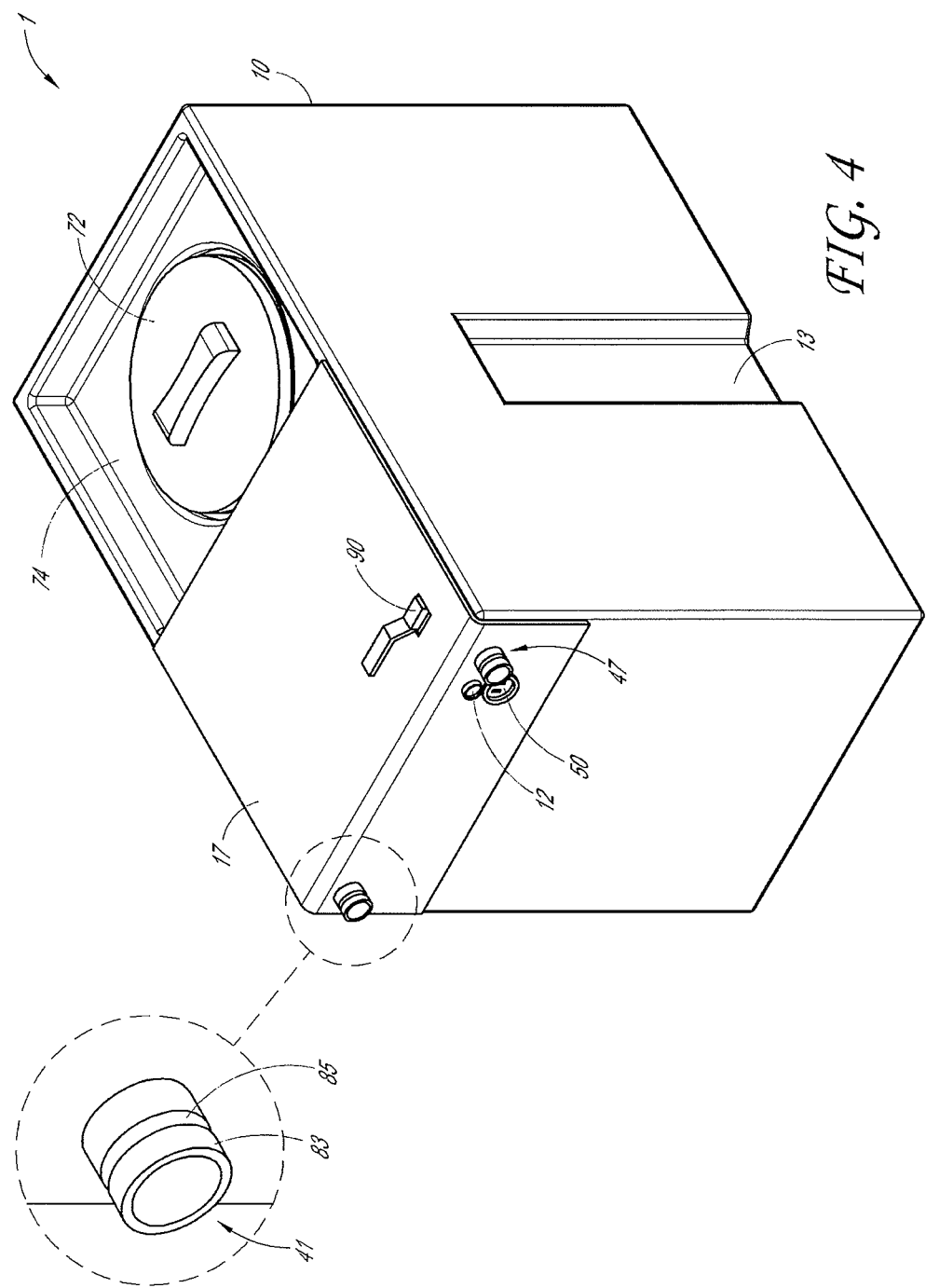
FIG. 4 is a front perspective view of the system of FIG. 1A.

FIGS. 3 and 4 illustrate an embodiment of the system 1 which includes a pump interface 17. The pump interface 17 can be a piece of material shaped to cover at least a portion of the top of the housing 10. In some embodiments, the pump interface 17 covers at least a portion of at least one side of the housing 10. For example, the pump interface 17 illustrated in FIGS. 3 and 4 covers a portion of the top of the housing 10 and a portion of one side of the housing 10. The pump interface 17 can include one or more cut out portions adapted to match one or more features of the housing 10 and the system 1. For example, the pump interface 17 can include a cutout for each of the outlet port 47 and the intake port 41. In some embodiments, the pump interface 17 can be constructed of a metallic material (e.g., tin, aluminum, steel, or another suitable metal or mix of metals). In some embodiments, the pump interface 17 is constructed of a plastic or some other suitable polymeric material.

In some embodiments, as illustrated in FIGS. 3 and 4, the housing 10 can include one or more channel features 13. For example, the housing 10 can have one or more channel features 13 on each side of the housing 10. In some embodiments, the channel features 13 extend from the bottom of the housing 10 to approximately half way up the side of the housing 10. In some embodiments, the channel features 13 extend from the bottom of the housing to approximately three quarters up the side of the housing 10. Many variations of the length and width of the channel features 13 are possible. In some embodiments, the housing 10 has one channel feature 13 on each of three sides of the housing 10. The channel feature 13 can help to stabilize the sides of the housing 10 and inhibit collapse and/or buckling of the sides of the housing 10. Furthermore, the housing 10 can include an indentation 74 on the top of the housing 10. In some embodiments, the indentation 74 corresponds with the top of the storage tank 70. In some embodiments, the indentation 74 is larger than or smaller than the top of the storage tank 70.

As illustrated in FIG. 5, the outlet hose 45 and/or the intake hose 49 can include a quick connect feature 80. For example, the quick connect feature 80 can include a connection portion 82. The connection portion 82 can define a generally cylindrical cavity with an axial centerline. In some embodiments, the cavity has another shape, such as, for example, an oval shape, rectangular shape, or any other shape or combination of shapes. In some embodiments, the connection portion 82 includes one or more engagement features 84 on the inside of the cavity. The one or more engagement features 84 can be, for example, a circumferential series of biased spheres configured to flex outwardly in the radial direction away from the axial centerline of the cavity in reaction to contact force. In some embodiments, the engagement features 84 can be one or more flexible tabs extending from the inner wall of the cylindrical cavity toward the axial centerline of the cavity. The intake port 41 and/or the outlet port 47 can include an extended feature 83.

The extended feature 83 can be shaped to match the inner walls of the cavity in the quick connect feature 80. In some embodiments, the extended feature 83 includes one or more connecting features 85 configured to connect with the engagement feature 84. For example, the connecting feature 85 can be an annular groove configured to releasably engage with one or more spherical engagement feature 84. In some embodiments, the quick connect features 80 on the intake hose 49 and outlet hose 45 can be shaped differently from each other to match unique shapes on the connecting features 85 of the intake port 41 and outlet port 47. In some such embodiments, inadvertent connection between, for example, the quick connect feature 80 of the intake hose 49 with the connecting feature 85 on the reuse port can be avoided.

FIG. 6 illustrates an embodiment of an intake or outlet hose 45, 49 that includes a handle member 60. The handle member 60 can be located on the end of the intake and/or outlet hose 45, 49 opposite the quick connect feature 80 of the hose 45, 49. In some embodiments, the handle member 60 includes a spout 64. In some embodiments, the spout 64 can have nozzle features to accelerate the flow of cooking oil or other fluid out from the spout 64. In some embodiments, the handle member 60 includes a handle 62. The handle 62 can assist the user of the system 1 in controlling the direction and location of the spout 64.

In some embodiments, the housing 10 can include one or more transport features on the bottom of the housing 10. For example, the housing 10 can have attached wheels that allow for easier transport of the housing 10 from one location to another. In some embodiments, the housing 10 includes one or more transport features adapted to engage with a hand truck, forklift, or other transport tool.

A method of using the system 1 can include using the drain 22 to transfer cooking oil from the cooking oil reservoir 20 to the filtering pan 30. The method can further include using the filtering pan 30 to filter at least some particulates from the transferred cooking oil. The user of the system can then decide whether to return the filtered cooking oil to the cooking oil reservoir 20 or to the storage tank 70. Upon deciding to transfer the filtered cooking oil to the storage tank 70, the user of the system 1 can insert the spout 64 or other end feature of the intake hose 49 into the filtering pan 30. In some configurations, the user can then transition the valve 90 to the storing orientation. The user can also transition the pump actuator 12 to the activation position. Transition of the actuator 12 to the activation position can power the pump 40. In some embodiments, powering the pump 40 facilitates transfer of cooking oil from the filtering pan 30 to the storage tank 70 via the intake hose 49, the pump 40, the pump outlet 42, and the storing channel 46.

In some embodiments, the user can transfer the used cooking oil from the filtering pan 30 to the storage tank 20 via the outlet hose 45. In some such embodiments, the valve 90 can be set to the reuse orientation and the spout 64 or other end feature of the outlet hose 45 can be inserted into the storage tank 70, as illustrated in FIG. 7. Upon transition of the actuator 12 to the activation position, the pump 40 can facilitate transfer of the cooking oil from the filtering pan 30 to the storage tank 70 via the intake hose 49, the pump 40, and the outlet hose 45.

On the other hand, the user can decide to transfer the filtered cooking oil back into the cooking oil reservoir 20. In some such scenarios, the user can insert the spout 64 or other end feature of the intake hose 49 into the filtering pan 30. Furthermore, the user can insert the spout 64 or other end feature of the outlet hose 45 into the cooking oil reservoir 20.

The user can then transition the valve 90 to the reuse orientation. Upon transition of the actuator 12 to the activation position, the pump 40 can facilitate transfer of cooking oil from the filtering pan 30 to the cooking oil reservoir 20 via the intake hose 49, the pump 40, and the outlet hose 45.

In some embodiments, the user can transfer used cooking oil from the storage tank 70 to a disposal location. For example, the spout 64 or other end feature of the intake hose 49 can be inserted into the storage tank 70 via the lid 72 or some other access point. The spout 64 or other end feature of the outlet hose 45 can be inserted into the desired disposal location. Upon transition of the actuator 12 to the activation position, the pump 40 can facilitate transfer of cooking oil from the storage tank 70 to the disposal location via the intake hose 49, the pump 40, and the outlet hose 45.

Figure 2:
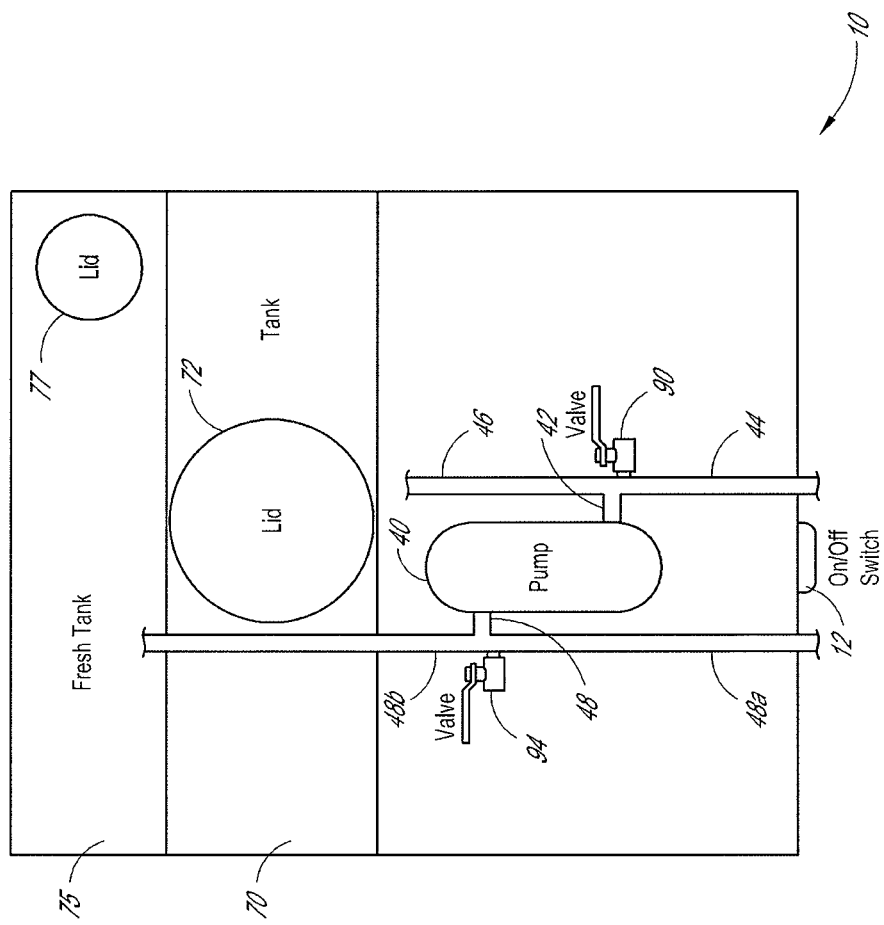
FIG. 2 is a top schematic view of an additional embodiment of a system for pumping and storing cooking oils.

FIG. 2 illustrates an embodiment of a system 2 for storing and/or transferring cooking oil that includes a second storage tank 75. In some embodiments, the second storage tank 75 can be used as a fresh oil holding tank. The system 2 can further include a second valve 94. In some embodiments, the second valve 94 is a three-way valve (e.g., a three-way ball valve). The second valve 94 can be configured to transition between a refresh orientation and a used orientation. For example, the second valve 94 can create fluid communication between the pump inlet 48 and the second storage tank 75 when the second valve 94 is in the refresh orientation. In some embodiments, the second valve 94 can create fluid communication between the intake port 41 and the pump inlet 48 when the second valve 94 is in the used orientation.

While the aforementioned description has shown, illustrated and described various systems and methods of implementing the present invention, it will be apparent that various substitutions, modifications, and changes to the implementation of these systems and methods can be made by a person of ordinary skill in the art without departing from the teachings of the present invention. Hence, the present invention should not be limited in scope to the foregoing description but should be afforded the full scope of the equivalents and changes understood by a person of ordinary skill in the art.

What is claimed is:

1. A system for pumping and storing cooking oil in a kitchen from one or both of a cooking oil reservoir and a filtration device, the system comprising:
   a housing defining an internal storage volume;
   a storage tank mounted within the housing;
   a pump mounted on a surface of the housing;
   a pump interface mounted on a top surface of the housing and a side surface of the housing, the pump interface having a top portion and a side portion;
   a first control valve located on one of the top portion of the pump interface, the side portion of the pump interface, and an outer surface of the housing and adapted to transition between a first orientation and a second orientation;
   at least one intake hose opening connected to the pump, the at least one intake hose opening located on one of the top portion of the pump interface, the side portion of the pump interface, and an outer surface of the housing that intakes oil from one of the cooking oil reservoir and the filtration device;
   at least one outlet hose opening connected to the pump, the at least one outlet hose opening located on one of the top portion of the pump interface, the side portion of the pump interface, and an outer surface of the housing that outputs oil away from the pump; and a pump actuator located on one of the top portion of the pump interface, the side portion of the pump interface, and an outer surface of the housing, the pump actuator transferable from a first configuration to a second configuration, wherein the pump is powered on when the pump actuator is in the first configuration and the pump is powered off when the pump actuator is in the second configuration;

wherein the pump pumps cooking oil from one of the cooking oil reservoir and the filtration device back to the cooking oil reservoir when the first control valve is in the first orientation and the pump actuator is in the first configuration and wherein the pump pumps cooking oil from one of the cooking oil reservoir and the filtration device to the storage tank when the first control valve is in the second orientation and the pump actuator is in the first configuration.

2. The system of claim 1, wherein the system further comprises:

a cooking oil compartment mounted on the outside of or on the inside of the housing;

a second control valve mounted on one of the top portion of the pump interface, the side portion of the pump interface, and an outer surface of the housing that transitions from a first setting to a second setting;

wherein the pump pumps oil from the cooking oil compartment to one of the storage tank and the cooking oil reservoir when the second control valve is set to the first setting and the pump actuator is in the first configuration and wherein the pump pumps cooking oil from one of the cooking oil reservoir and the filtration device to one of the storage tank and the cooking oil reservoir when the second control valve is set to the second setting and the pump actuator is in the first configuration.

* * * * *